July 13, 1943.  R. CHELBORG ET AL  2,323,977
APPARATUS FOR CONDITIONING METAL BODIES
Filed Oct. 8, 1941  9 Sheets-Sheet 1

Fig. 1.

INVENTORS
RUDOLPH CHELBORG
JAMES H. BUCKNAM
ARTHUR M. KELLER
BY
ATTORNEY

INVENTORS
RUDOLPH CHELBORG
JAMES H. BUCKNAM
ARTHUR M. KELLER
BY
ATTORNEY

July 13, 1943.   R. CHELBORG ET AL   2,323,977
APPARATUS FOR CONDITIONING METAL BODIES
Filed Oct. 8, 1941   9 Sheets-Sheet 9

INVENTORS
RUDOLPH CHELBORG
JAMES H. BUCKNAM
ARTHUR M. KELLER
BY
ATTORNEY

Patented July 13, 1943

2,323,977

UNITED STATES PATENT OFFICE 2,323,977

APPARATUS FOR CONDITIONING METAL BODIES

Rudolph Chelborg, Maplewood, James H. Bucknam, Cranford, and Arthur M. Keller, Livingston, N. J., assignors to The Linde Air Products Company, a corporation of Ohio Application October 8, 1941, Serial No. 414,120

21 Claims. (Cl. 266—23)

This invention relates to the art of surface conditioning metal bodies, and more particularly to apparatus for thermochemically removing a layer of surface metal from ferrous metal bodies such as steel bars, billets, blooms, slabs and the like, and to apparatus for thermally removing scale from such bodies.

During the casting of steel ingots and during the rolling of steel shapes, defects such as scale, slag inclusions, cracks, seams and the like form on and in the surfaces of such bodies, and in turn cause imperfections in the finished products. In order to reduce the number of rejections of finished products, it is desirable to condition such semi-finished bodies to remove such defects. Manually-operable deseaming blowpipes have been used heretofore to remove such defects, but when using such blowpipes it is necessary to allow such semi-finished bodies to cool below the rolling temperature. Desurfacing machines adapted to apply one or more streams of oxidizing gas such as oxygen and preferably preheating flames obliquely against and along one or more surfaces of such a metal body when at an elevated temperature, to thermochemically remove a relatively shallow layer of surface metal containing the defects, have been used for conditioning ferrous metal bodies. In general, such machines are preferably adapted to be installed in alignment with the usual roll table conveyor, to condition such bodies while moving from one rolling operation to another, and, especially when adapted to condition simultaneously all of the longitudinal surfaces of such bodies, such machines have been constructed and arranged to condition bodies of the same cross-sectional size.

The present invention provides an improved apparatus for thermochemically removing a relatively shallow layer of surface metal from a ferrous metal body, preferably while the body is at an elevated temperature and is moving along a roll table from one rolling operation to another. This invention provides apparatus also adaptable for thermally eliminating scale from such a body. The apparatus includes conditioning or desurfacing heads which are so supported and so constructed and arranged, that each of a succession of ferrous metal bodies can readily be conditioned, and the machine can quickly be adjusted to condition the surfaces of bodies of different cross-sectional dimensions.

The principal objects of this invention are to provide an improved desurfacing apparatus; to provide such an apparatus for simultaneously conditioning all of the longitudinal surfaces of a ferrous metal body during a single pass through the apparatus; to provide such an apparatus which is readily adjustable for simultaneously conditioning all of the longitudinal surfaces of each of a succession of ferrous metal bodies of different or of the same cross-sectional dimensions; to provide such an apparatus which can be readily adjusted for conditioning only two opposite longitudinal surfaces of a ferrous metal body, and which includes means for protecting the non-operating heads when so adjusted; to provide such an apparatus, including units having four conditioning heads, for simultaneously conditioning the four longitudinal sides of a rectangular ferrous metal body, and including means movably supporting such heads for centering about and adjacent the sides of the body in accordance with the size of the body; to provide such an apparatus which includes an improved raising and lowering mechanism for supporting these conditioning units; to provide an improved mechanism for moving one head of each unit relatively to the other head of the same unit, to vary the exposed width of the movable head; to provide a mechanism for visually indicating the exposed width of such movable head; to provide an improved mechanism for resiliently urging the conditioning heads toward the corresponding longitudinal surfaces; to provide such an apparatus including means for adjusting the distance between the desurfacing units; to provide such an apparatus including means for rapidly moving the heads toward the workpiece, and means for retarding this movement when the heads approach a position adjacent the workpiece to prevent damage to the workpiece and the heads; and, to provide such an apparatus which is more easily, accurately and efficiently controlled and operated.

These and other objects and novel features of this invention will become more apparent from the following description, taken in connection with the accompanying drawings, in which.

Figure 1:
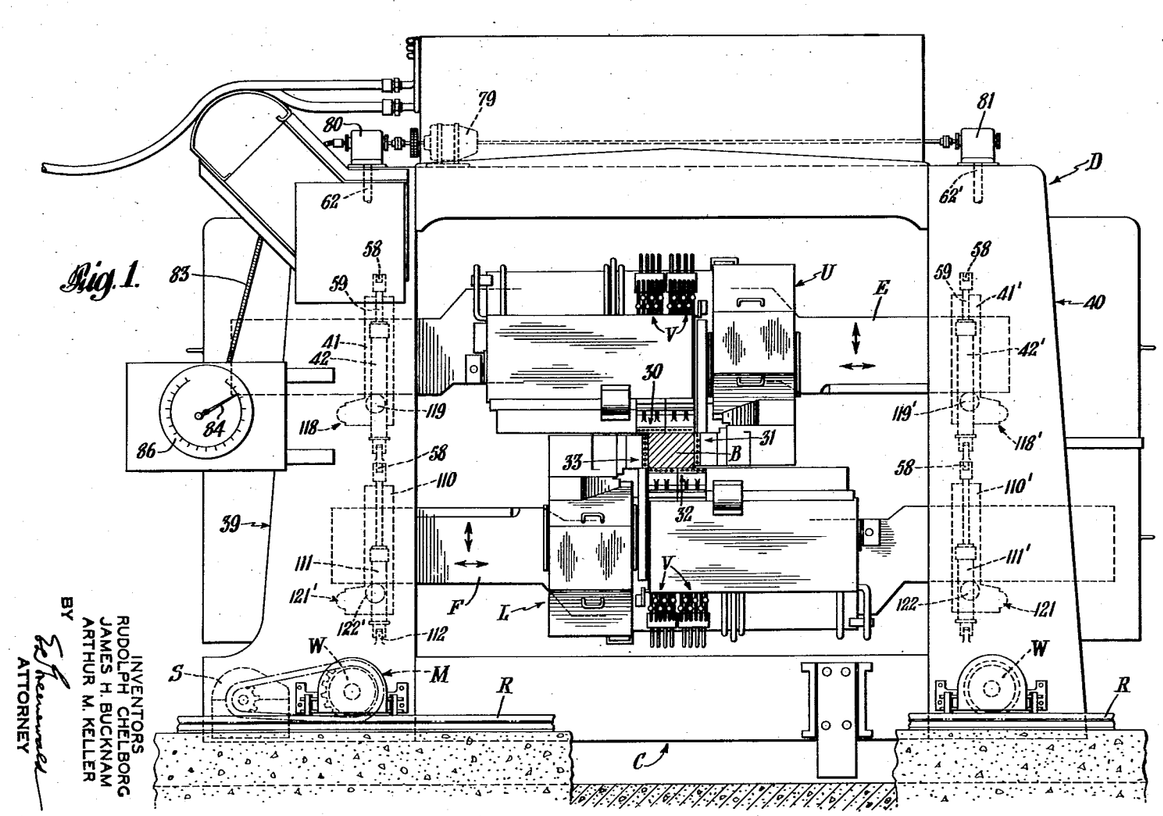
Fig. 1 is a front elevational view of a desurfacing machine embodying the principles of the present invention.

A desurfacing machine may be mounted on a fixed foundation for permanent installation in a roll table conveyor, such as is usually employed in steel mills for conveying semi-finished steel bodies from one rolling operation to another, but preferably is mounted for transverse movement into and out of alignment with the roll table conveyor. The accompanying drawings show one such machine embodying the features of the present invention. Referring more particularly to Fig. 1, the improved desurfacing machine D, is mounted on a carriage C, which includes four wheels W, and also includes an electrical drive motor M connected through a speed reducer S, to two of the wheels W, so that the machine can readily be moved along the rails R perpendicularly to, and into and out of operative aligment with, the steel bodies, such as a billet B, as they are moved in the direction of their length along a conventional roll table conveyor (not shown). Limit switches or other suitable means preferably are provided for controlling or limiting the transverse movement of the machine, and such means may be the same as or similar to the means disclosed in the copending United States patent application, Ser. No. 334,510, filed May 11, 1940, by A. M. Keller, J. H. Bucknam, and A. J. Miller.

The desurfacing machine D comprises an upper desurfacing unit U and a similar lower desurfacing unit L. The upper desurfacing unit U includes two desurfacing heads 30 and 31, adapted to desurface the top and right-hand longitudinal side surfaces of the billet B; and the similar lower desurfacing unit L also includes two desurfacing heads 32 and 33, adapted to desurface the bottom and left-hand longitudinal side surfaces of the billet B. Thus, the desurfacing units U and L are adapted simultaneously to condition all four longitudinal surfaces of the billet B, as it is propelled through the opening or area or passage which is enclosed by the desurfacing heads. The upper desurfacing unit U is mounted on a transverse beam E, and the lower unit L is mounted on a beam F. Both of the similar transverse beams E and F, are similarly supported at each end, and each beam and the unit thereon is both transversely and horizontally movable, and vertically movable to move the desurfacing unit toward and away from the billet B, and toward and away from the area enclosed by the heads to vary the size of the enclosed area, in accordance with the cross-sectional size of the body to be desurfaced.

The desurfacing heads may each comprise one or more separate sub-units or blowpipe units but these sub-units are maintained in fixed alignment with each other so that, in effect, each group of sub-units forms a single desurfacing head adapted to deliver a wide heating medium and a wide stream of oxygen. Accordingly, all of the desurfacing heads will be referred to as single heads, though any one of the heads or all of the heads may comprise a plurality of blow-pipe units or sub-units. Each of the desurfacing heads (Figs. 7 and 8) includes at least one nozzle block 35 which is adapted to operatively receive a row of nozzles 36, and includes a nozzle protecting shoe 38, which entirely encloses the nozzles 36, except the outlet ends thereof. Each nozzle 36 contains a central longitudinal passage terminating in a relatively large discharge orifice for discharging a relatively voluminous jet of oxidizing gas, such as oxygen, obliquely against and along the corresponding surface of the billet. Each nozzle 38 also preferably contains one or more relatively small substantially parallel gas passages for discharging a combustible gas mixture, such as a mixture of oxygen and acetylene which, when ignited, burns to form wide preheat flames impinging obliquely against and along the corresponding surface. The adjoining oxygen jets merge laterally to provide a wide stream of oxygen, and the individual preheat flames also may merge laterally to provide a wide preheating flame.

Thus, all of the nozzles from any one of the heads are so positioned and spaced as to apply a wide substantially sheet-like stream of oxygen of substantially uniform thickness at an acute angle against a relatively narrow transverse zone, extending at least substantially across the corresponding longitudinal surface of the billet B, and to supply if desirable, a wide high temperature preheat flame against such surface to heat at least a portion of the surface metal to the oxygen ignition temperature, and/or to aid in maintaining the cut and more efficiently removing surface metal from the slab when the slab is longitudinally moved relatively thereto. If desirable, the preheat flames may be eliminated except at the start of the reaction, or may be eliminated entirely when desurfacing bodies which are at sufficiently high temperature. Usually such preheat flames are used even when high temperature bodies are being desurfaced.

Each nozzle block is adapted to supply oxygen to the oxygen passage of each of the nozzles 36 therein, and to supply a combustible gas mixture to the preheating passages of each of such nozzles. Both the nozzle block 35 and the protecting shoe 38 are preferably adapted to circulate a cooling fluid such as water therethrough, to prevent overheating of the head and possible pre-ignition of the gases. Cooling water is supplied to each block 35 from a main supply line 34 through a connecting pipe 34', and the water after circulating through the blowpipe heads flows through pipe 37 to a drain 37'. Each desurfacing head is preferably adapted to bear against and slide along the corresponding longitudinal surface of the billet B, to position accurately the nozzles relative thereto, and accordingly deposits of hard-surfacing material are preferably provided on each nozzle protecting shoe 38 at 44 to engage the surface and prevent abrasion and damage to the head. The heads 30, 31, 32 and 33, may be any suitable type and may be the same as or similar to the blowpipe head described in the previously referred to copending United States application Serial No. 334,510.

As shown generally at G, means are provided for supplying both desurfacing oxygen and a combustible mixture of preheat gas to each of the nozzles 36. A suitable valving means is preferably provided for selectively turning on or off the flow of gases to a predetermined number of nozzles, so as to vary the effective width of each head in accordance with the width of the corresponding longitudinal billet surface. A suitable control mechanism for selectively controlling the flow of gases to a predetermined number of nozzles 36, is shown and claimed in the copending United States application Serial No. 414,086, filed October 8, 1941, by J. H. Bucknam, E. Meincke and L. W. Young. If desirable, manually operable valves, such as valves V, can be used for turning on or off the flow of gases to all or a part of the nozzles.

The cross-beams E and F and the desurfacing units mounted thereon, are each both vertically and horizontally movable in a vertical plane extending transversely relatively to the longitudinal axis of the workpiece or billet. The ends of the cross-beams extend into and/or through two corresponding supporting columns 39 and 40. As shown in Fig. 1, each end of the upper beam E is supported by a similar cradle member 41 or 41' respectively, each of which is in turn supported by and moved vertically by a pair of hydraulic cylinders 42 or 42'. Since each end of the beam E is similarly supported and vertically moved, only the supporting and moving mechanism for the left-hand end of the beam will be described in detail.

Figure 4:
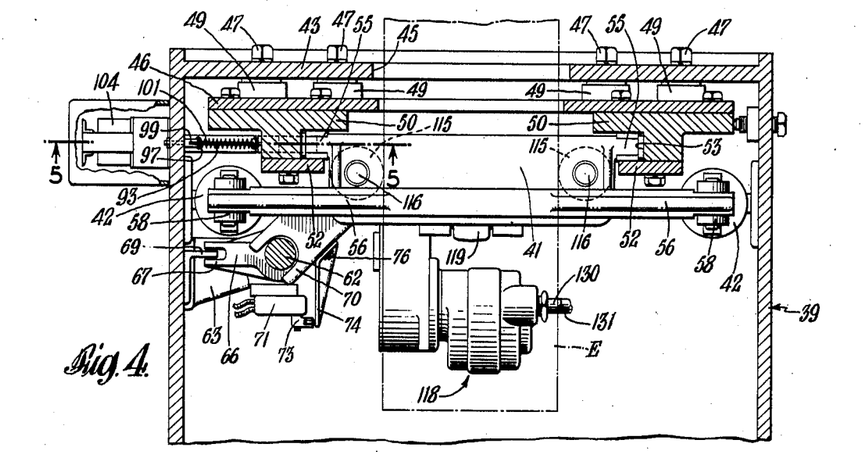
Fig. 4 is a horizontal cross-sectional view of the left-hand column taken along line 4—4 of Fig. 2.

Referring to Fig. 1 and more particularly to Figs. 2 to 5, the column 39 is seen to be substantially rectangular in cross-section. A plate 43 forms the inner side of the column and has an enlarged opening 45 therein, through which the beam E extends. To the inside of plate 43 there are fastened a pair of vertical, horizontally spaced plates 46. The plates 46 may be fastened to the plate 43 by bolts 47, and are spaced therefrom by spacers 49. To each plate 46 there is fastened a bar 50 which is substantially T-shaped in cross-section, and which has a retaining plate 52 secured thereto. The bars 50 and the plates 52 form a pair of vertical slideways 53 as shown in Fig. 4. The cradle member 41 includes a pair of outwardly extending tongues or slides 55 each of which is adapted to extend into and slide along the corresponding slideway 53, when the member 41 is raised or lowered. The member 41 also includes a pair of outwardly and upwardly extending arms 56. Each arm 56 is pivotally connected at 58 to the outer end of a piston rod 59 of one of the cylinders 42. Thus, when fluid under pressure is admitted to the head ends of the two pairs of cylinders 42 and 42' in the columns 39 and 40, the beam E and the desurfacing unit U are moved upwardly away from the billet B, and when the pressure is released the beam E and desurfacing unit U descend by gravity, toward the billet B.

The vertical thickness of the steel bodies moving along the roll table may vary, and as the bottom surface of each of such bodies rests on the roll table or similar supporting means (not shown), the bottom surface is always at the same level, but the level of the upper surface of the body to be conditioned may or may not be at the same level as that of the previously conditioned body. Accordingly, a mechanism is provided to limit the downward movement of the beam E and unit U. In the column 39, this mechanism includes a vertical shaft 62, supported pivotally at its lower end by a bracket 63. A lower portion 64 of shaft 62 is threaded and has threaded thereon a nut 66, having a forked or grooved portion 67, which engages an outwardly extending leg of the vertical, L-shaped member 69. The member 69 prevents the nut 66 from turning so that when the shaft 62 is rotated, the nut 66 is raised or lowered.

The member 41 has attached thereto or formed thereon an outwardly extending yoke 70, which partially encircles shaft 62. When the upper beam E and its supporting cradle member 41 are lowered into the operative position, the yoke 70 contacts the nut 66 whereby the downward movement of the beam E is positively limited. A limit switch 71, having an outwardly extending switch arm 73, is mounted on the nut 66, as more particularly shown in Figs. 2 and 4. A downwardly extending finger 74, is fastened to yoke 70 by means of bolts 76. The bolts 76 extend through a slot in the finger 74, which slot permits vertical adjustment of the finger. As the upper beam E is lowered, the finger 74 contacts and moves the limit switch arm 73, to operate the limit switch 71, which is electrically connected to a suitable, preferably solenoid operated valve means, to reduce the rate of flow of fluid from the head ends of the two cylinders 42, and thus retard the rate of downward movement of the beam E. This permits rapid initial downward movement of the desurfacing unit U, which downward movement is then automatically retarded before the head 30 contacts the billet B, to prevent damage to the apparatus. Additionally, there is provided a shock absorber 77, which engages the bottom of the member 41, to prevent damage to the upper desurfacing unit, if for any reason this unit is moved to its lowermost position. The shock absorber 77, also may act as a support during periods when the machine M is not in operation.

The right-hand end of the beam E is similarly supported by cradle member 41', and is moved vertically by a similar pair of hydraulic cylinders 42'. There is also mounted in the right-hand supporting column a similar mechanism, for limiting the downward movement of the right-hand end of the cross-beam E.

In the upper portion of the machine M there is a motor 79, which is operatively connected through a speed reducer 80 to the vertical rod 62 in the left-hand column 39, and is operatively connected through a second similar speed reducer 81, to a similar vertical rod 62' in the right-hand column 40. Thus, when the motor 79 is energized the vertical rods 62 and 62' are rotated to raise or lower the nuts thereon equal distances, to control or limit downward movement of the upper desurfacing unit U.

A flexible cable 83 is operatively connected to the speed reducer 80, and to a pointer 84 provided with a dial 86, so as to provide a visual indication of the vertical thickness of the workpiece which the machine M is adjusted to accommodate. The operator, while located at the control table, not shown, operates a switch to selectively energize the motor 79, and watches the pointer 84 as it is moved around dial 86, so as to accurately adjust the desurfacing machine to accommodate a workpiece of predetermined thickness.

Referring to Figs. 2 to 5, a similar latching means 87, is provided in each of the columns 39 and 40, for holding the unit U and beam E in the upper retracted position, in the event the cylinders 42 and 42' fail to function properly. The latching mechanism 87 includes a latch 88, pivotally mounted at 89, in one of the bars 50. The latch 88 is formed with an outwardly extending portion 92, adapted to engage the bottom surface of member 41, and prevent further downward movement of the beam. A rod 93 is connected at one end to a bracket 94, which is in turn pivotally connected at 96 to latch 87. The other end of the rod 93 extends through a hole in a bracket 97, pivotally connected to a bracket 99, mounted on the side of column 39. A compressed spring 101, is confined on rod 93 by brackets 94 and 97, and tends to urge the latch toward the right. When the desurfacing unit U is not in its uppermost position, edge 102 of latch portion 92 is urged into contact with the side of member 41 by spring 101, and when the member 41 is raised to the upward position, the latch 88 is snapped into a locking or engaging position, so that portion 92 is underneath but normally spaced from the member 41, so that if the fluid pressure fails, the latch 88 prevents the desurfacing unit from dropping an appreciable distance, and maintains the desurfacing unit in the raised inoperative position.

Electrically controlled means are provided for releasing the latching means 87. On the outside of column 39 there is mounted a solenoid 104, having a core 105, which is connected through a spring in the housing tube 106 to the latch 88. When the electrical circuit to the solenoid 104 is closed, as by a suitable switch (not shown), the solenoid is energized, and the core 105 and latch 88 are moved toward the left against the pressure of spring 101, so that the upper desurfacing unit U can be moved downwardly into an operative position. The spring in the tube 106 prevents burnouts of the solenoid coil, as it permits movement of core 105 toward the left when the latch is locked or jammed in the position shown in Fig. 5.

The lower beam F and the desurfacing unit L thereon, are also supported for vertical movement toward and away from the billet B. As shown more particularly in Figs. 1, 2, and 3, the left-hand end of the beam F extends into the left-hand column 39, and is supported therein by a cradle member 110, which is similar to the member 41. The member 110 is supported by and is moved vertically by a pair of hydraulic cylinders 111, each of which is pivotally supported at 112 in the column 39. The right-hand end of the beam F is similarly supported in the column 40 by a similar cradle member 110', which is supported and moved vertically by a pair of similar hydraulic cylinders 111'. Thus, when fluid pressure is admitted to the head ends of the cylinders 111 and 111', the lower desurfacing unit L is raised toward the bottom surface of the billet B. When the pressure in the head ends of the four hydraulic cylinders is released, the lower desurfacing unit L is lowered away from the billet under the influence of gravity. When the desurfacing unit L is in the retracted or lowermost position, it is supported by a cushion 114 in each of the columns 39 and 40. As the lower desurfacing unit is always raised to the same operating level no mechanism is provided or is necessary for varying the uppermost limit of movement.

Figure 2:
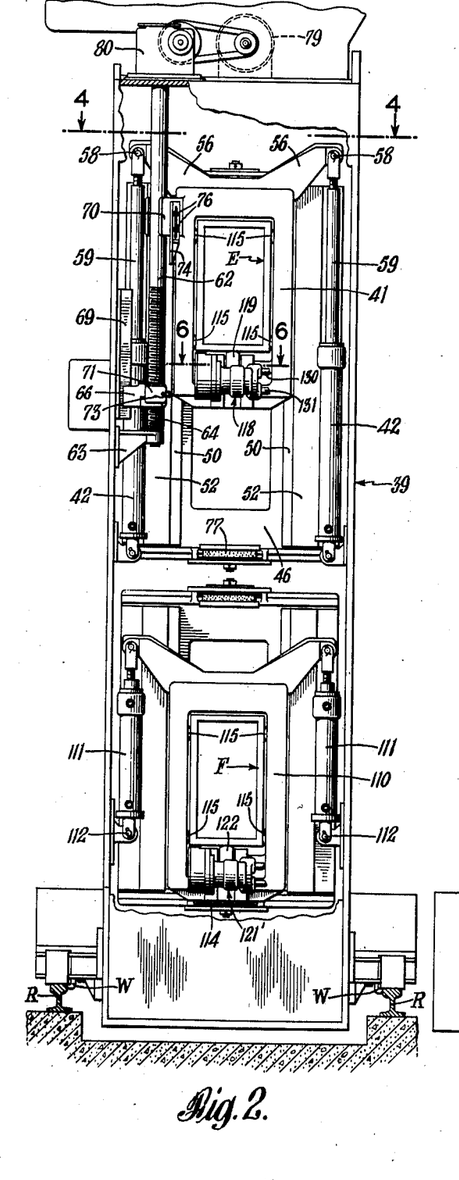
Fig. 2 is a side elevational view of the left-hand supporting column of the machine of Fig. 1 with portions of the housing broken away to more clearly show the internal structure.
Figure 3:
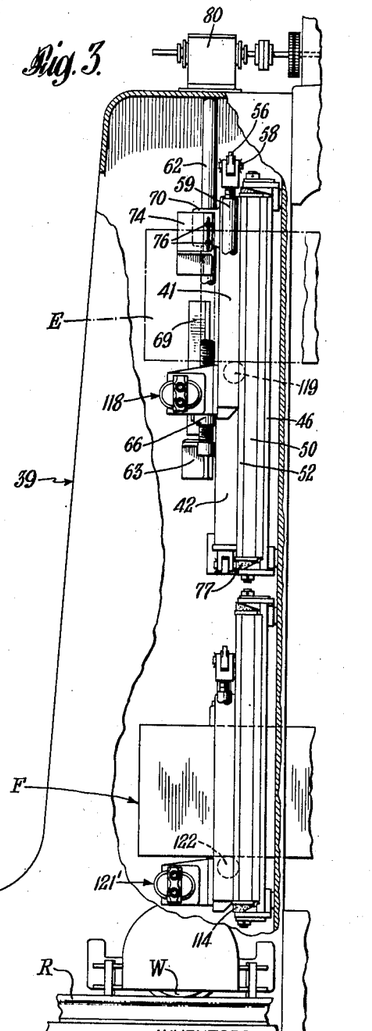
Fig. 3 is a front elevational view of the supporting column of Fig. 2, with portions of the housing broken away to show more clearly the internal structure.
Figures 5, 6:
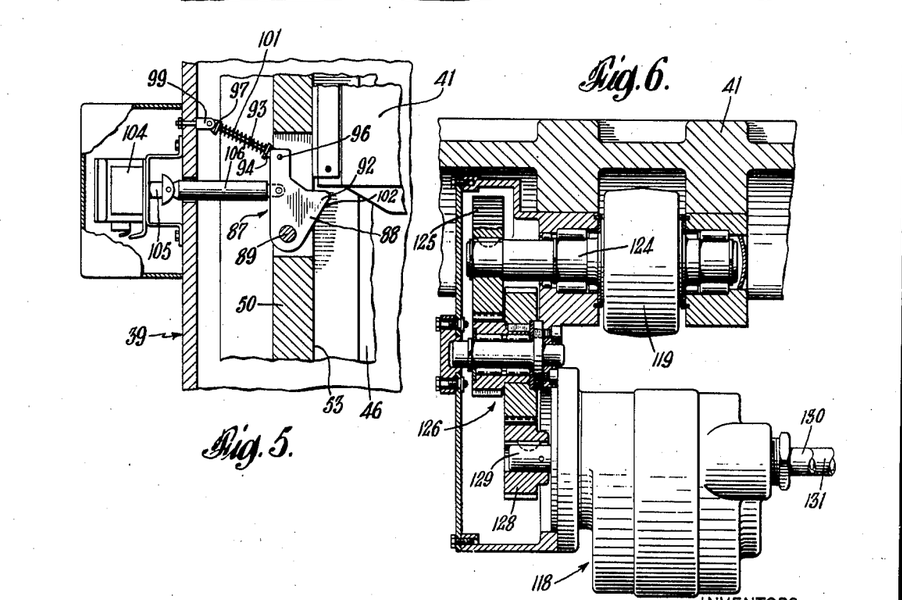
Fig. 5 is an enlarged view, partially in section, showing the solenoid-operated latch mechanism and taken along the line 5—5 of Fig. 4.
Fig. 6 is an enlarged fragmentary view, partially in section, of the hydraulic motor and roller mechanism for transversely moving the upper cross beam and the desurfacing unit thereon, and is taken along line 6—6 of Fig. 2.

Each of the beams E and F is supported for transverse horizontal movement. As shown in Figs. 2, 4, and 6, four rollers 115 are rotatably mounted on corresponding pins 116 in the member 41. Two or the rollers 115 contact the front face of the beam E, and the other two rollers 115 contact the rear face of the beam. The rollers are so positioned and mounted as to prevent forward or rearward tilting of the beam, and so as to reduce friction and the power necessary to move the beam transversely. Similar rollers are mounted in the member 41' for confining the opposite end of the beam E. Similar rollers are also mounted in each of the members 110 and 110'.

As shown in Fig. 1, the reversible hydraulic fluid-operated motor 118, is mounted in the lower portion of the member 41, and drives a roller 119, which contacts the bottom surface of the beam E. A similar hydraulic motor 118' is mounted in the lower portion of the member 41', and includes a roller 19' which contacts the bottom surface of the beam E. When fluid under pressure is admitted to the motors 118, and 118', the rollers 119 and 119' are rotated, and the beam E is moved horizontally toward the left or the right, to move the desurfacing unit U either toward or away from the billet B. When the unit U has been moved to an operative position adjacent the billet B, the motor 18 is made inoperative. The roller 119' and motor 118' are operated by fluid which is regulated through a pressure control valve, so as to urge the shoe 38 of head 31 into engagement with the billet at a predetermined pressure. Thus, the motor 118' applies a predetermined torque to the roller 119', to urge the head 31 against the billet B at a predetermined pressure. A similar reversible motor 121 is mounted in the lower portion of the right-hand member 110', and includes a roller 122 which contacts the bottom surface of the beam F, and a similar constant-torque motor 121' is mounted in the lower portion of member 110, and includes a roller 122'. The motors 121 and 121' move the beam horizontally toward the right or the left, to move the desurfacing unit L either toward or away from the billet B. The fluid for the hydraulic motor 121' is regulated through a pressure control valve, and only the motor 121 is used to urge the shoe 38 of the head 33 against the billet at a predetermined pressure.

The motors 118, 118', 121 and 121', are similar to one another, and only one motor will be described in detail. Referring more particularly to Figs. 2-4 and 7, the roller 119 is mounted on a shaft 124 journalled in the member 41. On the outer end of shaft 124 there is keyed a spur gear 125, which is connected through a gear train 126 to a spur gear 128, keyed to the outer end of the output shaft 129 of the motor 118. The motor 118 is provided with a fluid connection 130 and a fluid connection 131. When fluid under pressure flows through connection 130 the motor 118 and out the connection 131, the output shaft 129 is rotated, which in turn rotates the roller 119 to move the beam E toward the right. When the direction of flow through the motor is reversed by valving means, not shown, the roller 119 is rotated in the opposite direction, to move beam E toward the left. Thus, each of the desurfacing units U and L is movable both vertically and horizontally in a vertical plane extending transversely of, or perpendicularly to, the direction of movement of the steel bodies being desurfaced.

Under normal operating conditions, the motors 118 and 118' are operated in tandem to move horizontally the upper beam E, and the motors 121 and 121' are operated in tandem to horizontally move the lower beam F. The units U and L are normally simultaneously moved horizontally either toward or away from the billet B. When the units U and L have been moved into engagement with the billet B, the flow of fluid to the motors 118 and 121 may be shut off, so that only the motors 118' and 121' are used to urge the units U and L into contact with the billet at equal pressures.

The desurfacing units U and L are substantially similar in construction, and only the lower unit will be fully described in detail. Referring more particularly to Figs. 8 to 13, the beam F is hollow, and is substantially rectangular in cross-section. The middle portion of the beam is formed with an open side toward the front, which is normally covered or closed by a plate 135 fastened thereto. A generally U-shaped member 136, having reenforcing ribs 137, formed thereon encircles the beam F. A plate 139 is secured to the front open side of the member 136, so that the plate 139 and member 136 form a box-like member 138 completely encircling the middle portion of the beam, for supporting the desurfacing heads 32 and 33. The head 32 is fastened directly to the plate 139 by bolts 140. As shown, head 32 includes two separate, multiple nozzle blowpipe heads and if desirable, additional blowpipe heads may be bolted to the plate 139 so that the width of the desurfacing head 32 will be equal to the widest body to be desurfaced.

Figure 7:
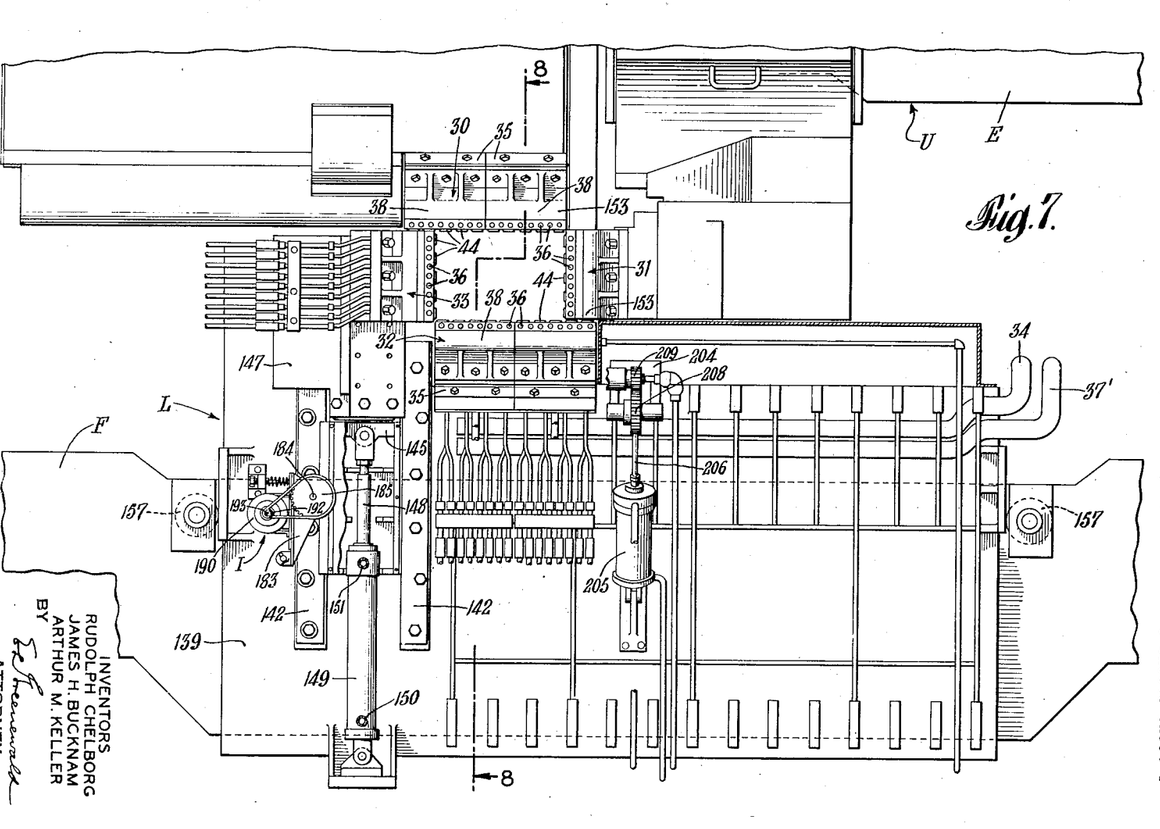
Fig. 7 is an enlarged partial view of the desurfacing units with portions broken away to show more clearly the internal structure and the means for vertically adjusting the left side desurfacing head of the machine.
Figure 10:
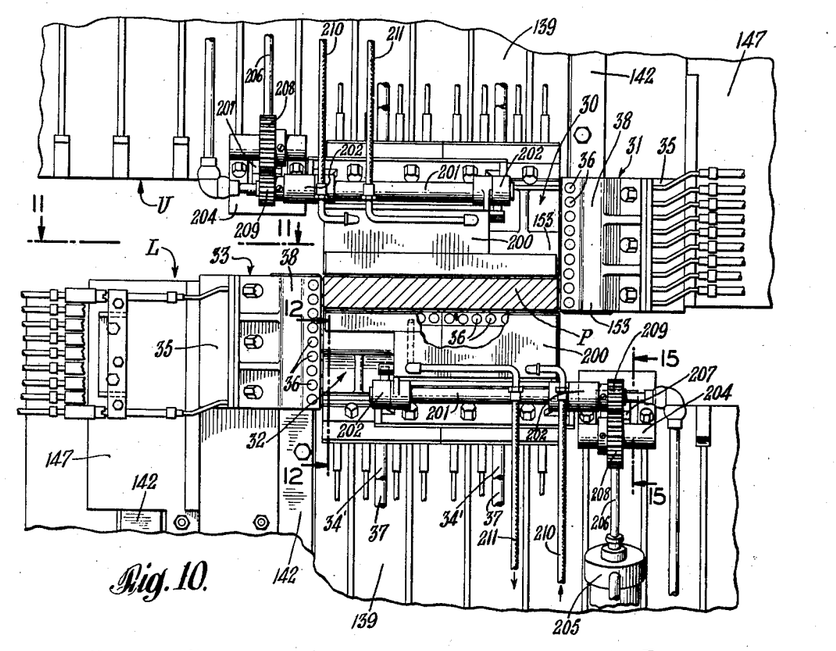
Fig. 10 is a partial front elevational view of the desurfacing units when disposed about a relatively thin slab, with portions broken away to show more clearly the internal structure.
Figure 11:
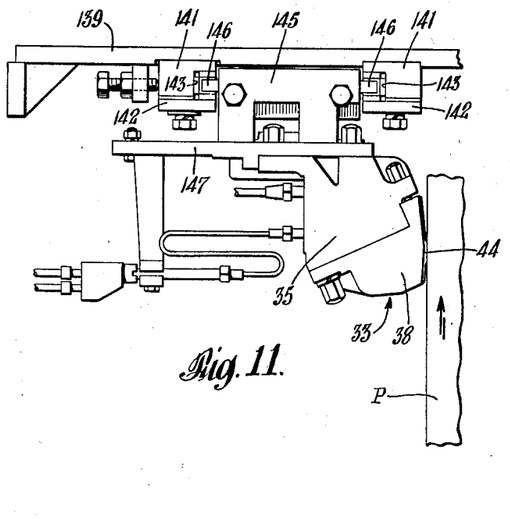
Fig. 11 is a top plan view of a side desurfacing head with its supporting mechanism, and is taken along line 11—11 of Fig. 10.
Figure 12:
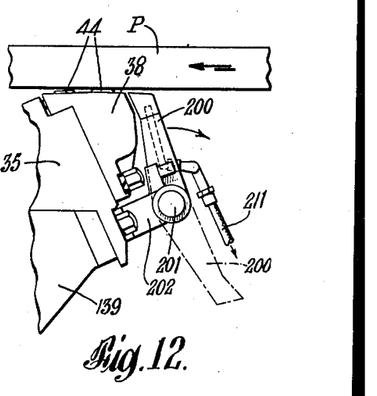
Fig. 12 is an enlarged fragmentary side view of the bottom desurfacing head and taken along line 12—12 of Fig. 10.

As shown more clearly in Figs. 7, 10, and 11, to the plate 139 there are fastened a pair of spaced, vertical, L-shaped bars 141, and to each bar 141 there is secured a plate 142 in such a manner that there is formed a pair of opposed ways or grooves 143. A slide 145 has a pair of outwardly extending tongues 146, which extend into and slidingly engage the ways 143. To the slide 145 there is fastened a carrier plate 147, on which is mounted the side head 33. As shown in Fig. 7, to the lower end of slide 145, there is pivotally connected the outer end of a piston rod 148 of a cylinder 149, mounted on the plate 139. When fluid or gas under pressure is admitted to the head end of the cylinder 149 through the port 150 by suitable flow control means, the head 33 is raised to increase the number of exposed or operative nozzles, and to increase the exposed or operative width of the head in accordance with the width of the corresponding longitudinal surface of the workpiece. Similarly, when the pressure is released in the head end of the cylinder 149, and fluid or gas is admitted to the rod end through the port 151, the head 33 is lowered to decrease the exposed or operating width of the head when desurfacing a relatively thin slab or plate P, such as is shown in Fig. 10.

The head 31 is similarly lowered or raised to increase or decrease its exposed or operative width, in accordance with the width of the corresponding longitudinal surface of the slab or plate. The side heads 31 and 33 can thus be raised or lowered, and the units U and L can be moved horizontally so that the exposed or operative width of each of the heads and the transverse dimensions of the passage enclosed by the heads, can be readily adjusted in accordance with the size of the workpiece. A similar end 153 of each head is maintained substantially flush with an adjacent edge of the workpiece, and also inside of the head adjacent thereto, so that the heads in effect can be given a semi-rotational movement for enlarging or reducing and/or changing the transverse dimensions of the passage or opening enclosed by the heads. As each desurfacing unit is urged both vertically and horizontally toward the workpiece, the heads tend to correctly center themselves about the workpiece.

Figures 8, 9:
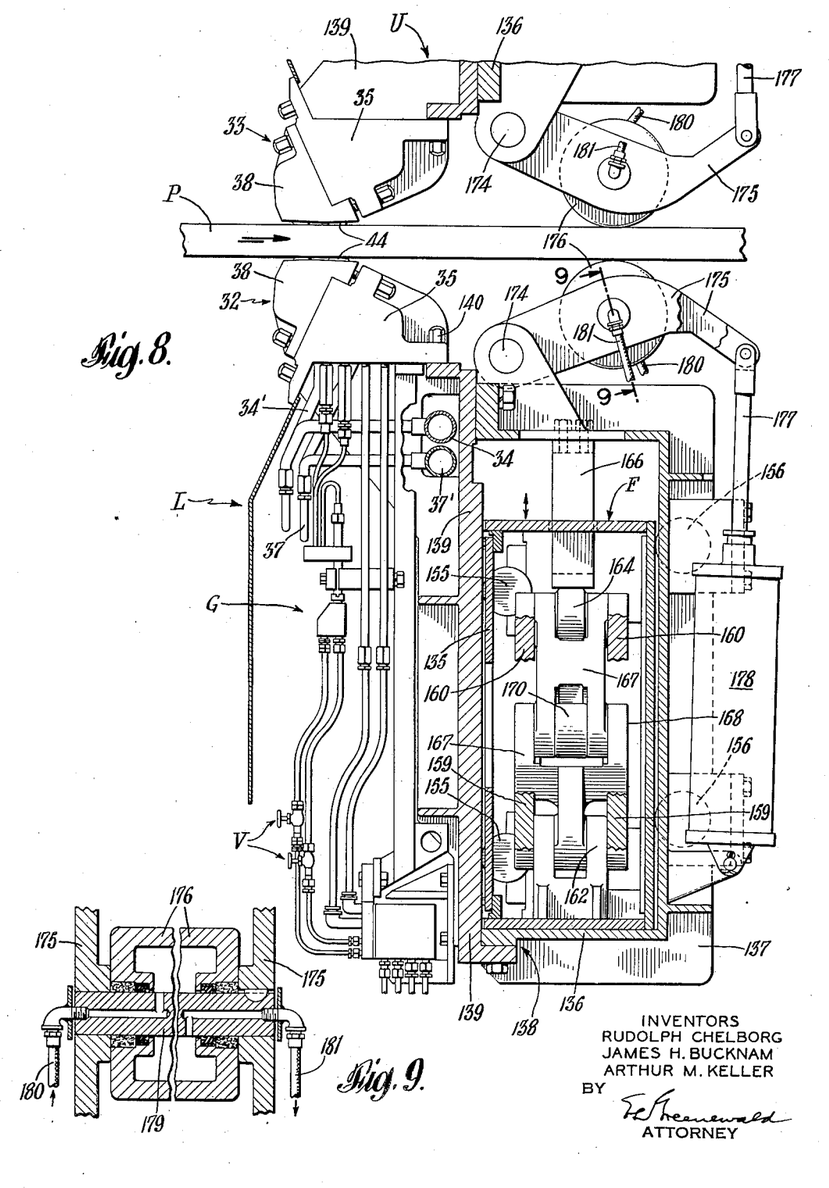
Fig. 8 is a vertical sectional view mainly of the lower desurfacing unit, and is taken along line 8—8 of Fig. 7.
Fig. 9 is an enlarged sectional view of one of the work contacting rollers, and is taken along line 9—9 of Fig. 8.

Referring more particularly to Figs. 1, 8 and 16 to 20, each of the desurfacing units is so mounted on its corresponding beam, as to have a limited amount of vertical float. As each of the units U and L is similarly supported, only the supporting means for one of the units will be described in detail. As previously described, the box-like member 138 of unit L completely encircles the beam F. On the front of the beam F there are pivotally mounted four rollers 155, which engage the inside surface of plate 139, and also there are four rollers 156 pivotally mounted in member 136, and which engage the rear surface of beam F as shown in Fig. 8. The rollers 155 and 156 prevent fore and aft tilting of the box-like member 138, while permitting free vertical movement. Two rollers 157 are mounted on the beam F, in a position to engage the ends of the box-like member 138 for preventing movement of member 138 longitudinally of the beam. The rollers 155, 156 and 157, permit vertical movement of member 138, reduce friction and power necessary to raise the desurfacing unit L, and, prevent tilting or movement of the member 138 relative to beam F other than the desired vertical movement.

As shown in Fig. 8, there is a vertical space between the beam F and the member 138, to permit vertical movement of the member relative to the beam. Inside of the beam F, there are two crossed arms 159 and 160, pivotally connected together centrally at 161. One end of arm 159 is pivotally connected to the beam F at 162, and the other end of arm 159 and both ends of arm 160, each has pivotally mounted therein a roller 164. One of the rollers 164 on arm 160 engages a pad 165 in the beam F, and each of the other two rollers 164 at the upper ends of arms 159 and 160, engages a downwardly projecting member 166 attached to the box-like member 138, that extends through the top of the beam F. To each end of each arm 159 and 160, there is pivotally connected an outer end of one of four similar toggle links 167. The central ends of each pair of toggle links are pivotally connected together by pins 168, and to each pin 168 there is connected the outer end of a horizontally disposed rod 170. Each rod 170 extends into a casing 171, and has threaded thereon a collar 172. A compressed coil spring 173 is disposed around a rod 170, and confined between collar 172 and the end of casing 171. Thus, each rod 170 is urged outwardly, which tends to straighten the toggle joint, and spread the arms 159 and 160 to raise the desurfacing unit until the inside bottom surface of member 138 engages the bottom of the beam F.

The arms 159 and 160 and the toggle links 167, are so proportioned and arranged with respect to the spring 173 that the toggle leverage is greatest when the spring force is least, and the toggle leverage is least when the spring force is greatest, thereby maintaining substantially constant the vertical force against the members 166, throughout substantially the full vertical displacement of the members 166. Thus, a substantially constant vertical force is produced to overcome a constant gravitational load by the employment of a coil spring, the force of which changes according to the degree of compression thereof. The springs 173 are of such strength as to move the unit L upwardly against the force of gravity, and in practice these springs urge the unit L upwardly with a force of approximately five hundred pounds in excess of the force necessary to overcome the effect of gravity.

The upper desurfacing unit U is similarly mounted on the beam E, except that the corresponding springs 173 in the beam E are relatively weaker, and are strong enough to counterbalance only part of the weight of the upper unit so that normally there is a space between the top of the beam E and the upper member 136. The lower unit L is raised and urged upwardly against the workpiece by springs 173 whereas the upper unit U is urged against the workpiece by gravity which the upper springs 173 do not completely counterbalance. When the beams E and F are moved vertically to their operative positions, both beams are preferably moved a short distance further than necessary to just bring the desurfacing heads into contact with the workpiece and this additional movement of the beams moves beam F upwardly relatively to the lower member 136, and moves beam E downwardly relatively to the upper member 136. In practice each unit has about six inches of movement relative to its supporting beam, and the beams are moved approximately three inches past the point at which the top and bottom heads first contact the workpiece, so that during the desurfacing operation each unit can automatically move upwardly or downwardly about three inches to follow irregular workpieces. More or less float can be provided, and the pressure of the heads can be varied to a certain extent by adjusting the collar 172 and nut 172' if desirable.

Adjustable means are preferably provided for accurately controlling and adjusting the pressure of the top and bottom heads against the corresponding top and bottom longitudinal surfaces of the billet. As shown more clearly in Fig. 8 an arm 175 is pivotally connected to the member 138 of each unit adjacent the desurfacing head at 174, and has a work contacting roller 176 pivotally mounted on a horizontal transverse shaft 179 therein. The roller 176 is preferably formed with an internal chamber (Fig. 9), and the shaft 179 is provided with suitable fluid passages and is connected to a fluid inlet hose 180 and a fluid outlet hose 181, whereby a cooling fluid such as water can be circulated through the chamber of the roller. The outer end of each arm 175 is connected to the outer end of a piston rod 177 of a cylinder 178 mounted on the back of the corresponding desurfacing unit. When gas or fluid under pressure is admitted to the head ends of the cylinders 178, they tend to urge the desurfacing units away from the workpiece, and partially remove the force due to springs 173 of the lower unit L between the desurfacing heads 32 and the billet, and partially take up part of the force due to gravity on the upper unit U, between the desurfacing heads 30 and the billet. The lower cylinder 178 tends to increase the effect of gravity, whereas the upper cylinder 178 tends to overcome or reduce the effect of gravity with respect to the pressure of the heads on the billet. The cylinders 178 thus provide an improved means for quickly and accurately controlling and infinitely varying the pressure of the heads against the workpiece.

Figures 13, 15:
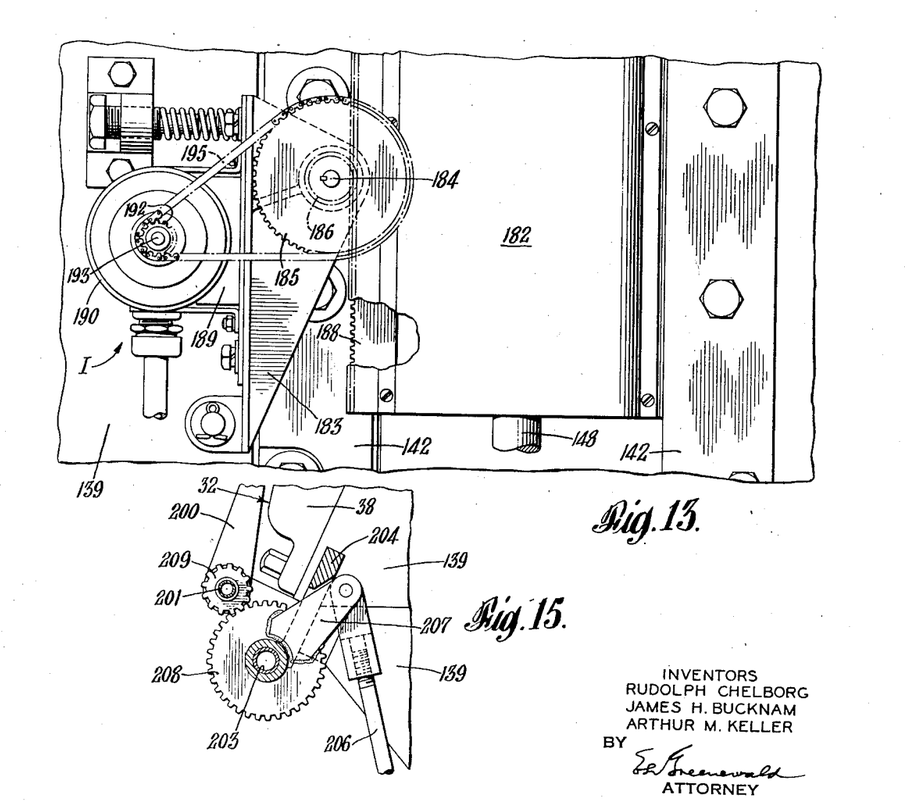
Fig. 13 is an enlarged, front elevational, fragmentary view of the mechanism for indicating the position of one of the side desurfacing heads.
Fig. 15 is an enlarged fragmentary view, taken along line 15—15 of Fig. 10, showing the mechanism for moving the nozzle-protecting shield into and out of operative position.
Figure 14:
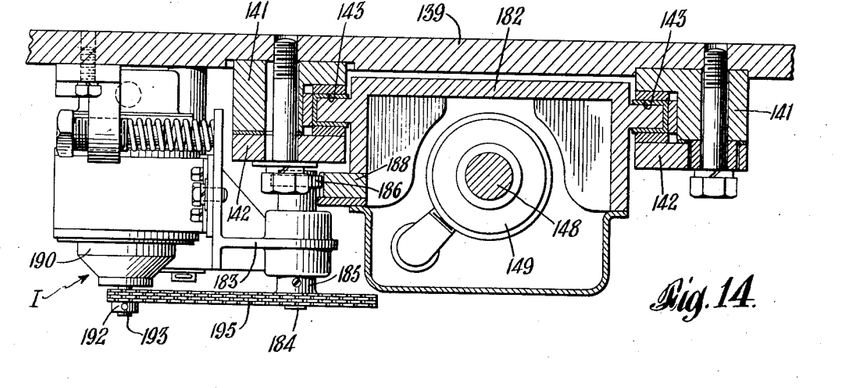
Fig. 14 is a plan view, partially in section, of the position-indicating device of Fig. 13.
Figures 16, 17:
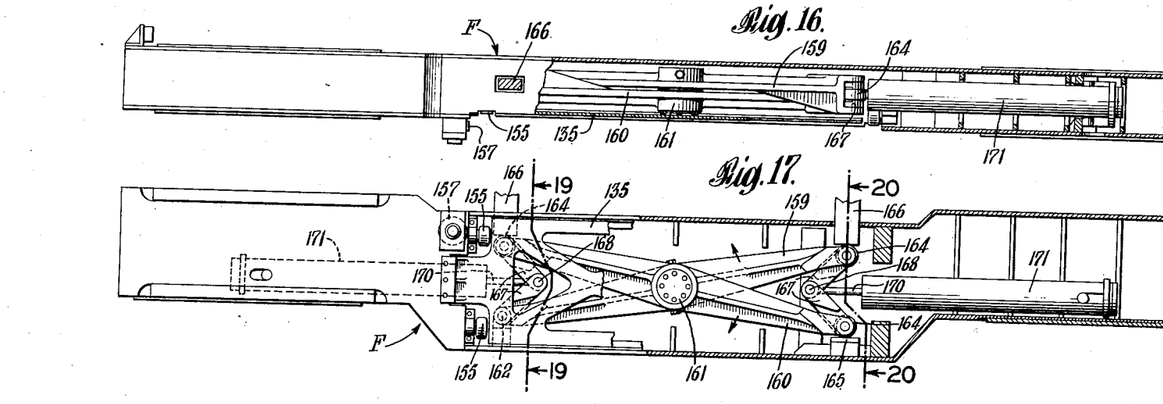
Figs. 16 and 17 are enlarged views of the lower cross beam, with portions broken away to show the internal counterbalancing mechanism.
Figure 18:
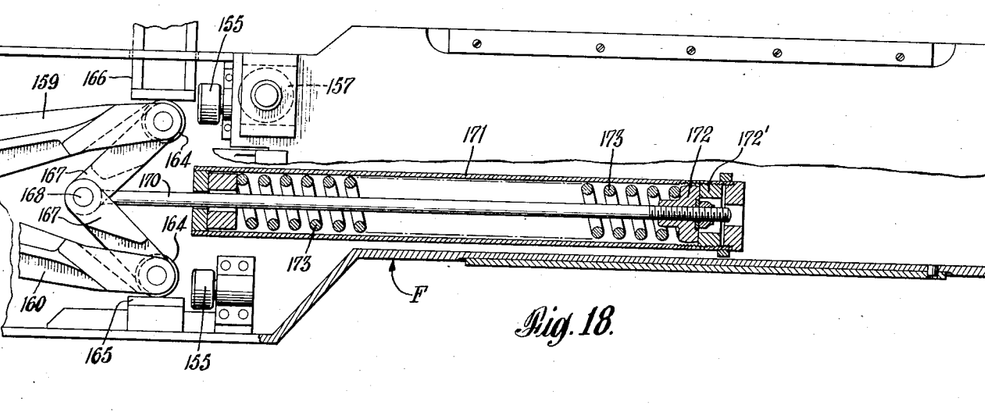
Fig. 18 is an enlarged fragmentary view of part of the counterbalancing mechanism shown in Figs. 16 and 17.
Figure 19:
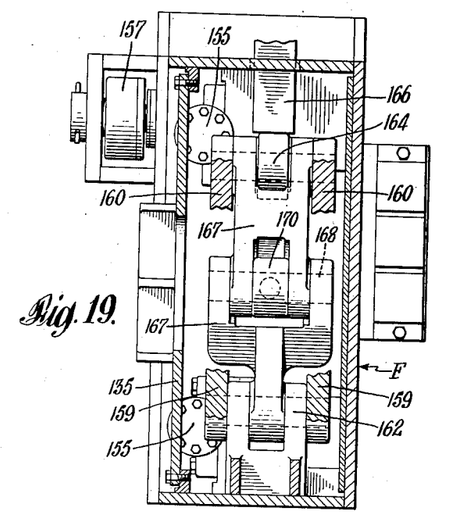
Fig. 19 is an enlarged sectional view taken along line 19—19 of Fig. 17.
Figure 20:
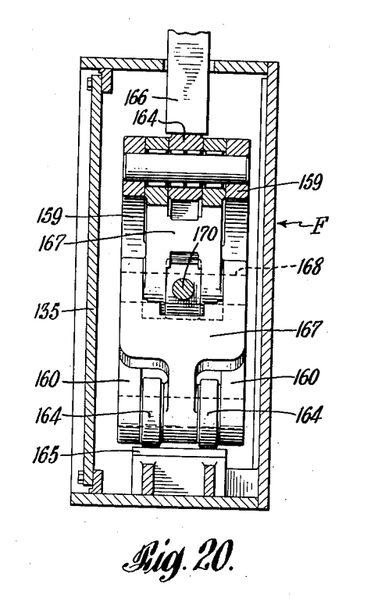
Fig. 20 is an enlarged sectional view taken along line 20—20 of Fig. 17.

Referring more particularly to Figs. 7, 13 and 14, an indicating means I is provided, for visually indicating the position or the exposed or operative width of each of the side heads 31 and 33. To the bottom of the slide 145 is attached a U-shaped member 182, also adapted to engage and slide along the ways 143. To plate 139 there is fastened a bracket 183, on which is journalled a short shaft 184 having secured thereto a relatively large sprocket gear 185, and a small gear or pinion 186 which engages the teeth of a rack 188 attached to member 182. A bracket 189 is also mounted on bracket 183, and supports a self-synchronous motor transmitter 190, having a relatively small sprocket 192 fastened to the outer end of its rotor shaft 193. The sprockets 185 and 192 are connected by a chain 195, so that when the head 33 is moved vertically by the cylinder 149 the rotor shaft 193 of motor 190 is rotated a corresponding number of revolutions, which operates an indicator located at the control table, or other suitable location, to indicate the exposed or operating width of the head 33.

Figure 21:
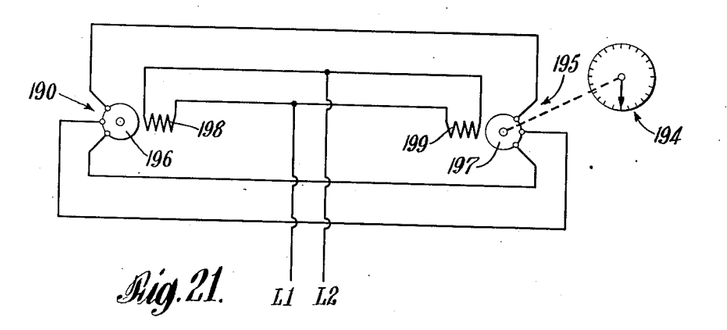
Fig. 21 is a wiring diagram of the mechanism for indicating the position of one of the side desurfacing heads.

Referring to Fig. 21, on the control table, or at any other suitable location, there is mounted a suitable indicator means including a calibrated dial and pointer, which is directly connected to the rotor shaft of a self-synchronous motor receiver 195 as schematically shown at 194, so that the pointer and the rotor of the receiver move in unison. As shown by this wiring diagram of the self-synchronous motor transmitter 190 and the self-synchronous motor receiver 195, the transmitter rotor 196 and the receiver rotor 197 are each provided with three-phase windings electrically connected in parallel. The stators 198 and 199 are of a bi-polar construction, having single-phase excitation windings energized from a single-phase alternating current source by lines L1 and L2. With the stators 198 and 199 energized, any angular movement of the transmitter rotor 196 is electrically transmitted to the receiver, causing an equivalent angular movement of the receiver rotor 197. Thus, when the head 33 is raised or lowered the pointer of indicator 194 is moved a proportionate amount, and in a corresponding rotary direction. A similar adjusting and indicating means is also provided for head 31, whereby the operator can readily adjust the said heads 31 and 33, to vary the exposed width of each in accordance with the width of the corresponding longitudinal billet surface.

Especially when conditioning relatively thin ferrous metal bodies, such as a steel slab or plate P, it is often desirable to condition or desurface only the edges where more of the defects are concentrated. Referring more particularly to Figs. 10 to 12 and 15, similar mechanisms are provided for each of the top and bottom heads 30 and 32, for moving a shield 200 into position to protect the head when not in use, and prevent slag and any other foreign material from damaging the heads and/or clogging the nozzles 36. Only the bottom shield 200 will be described in detail.

The shield 200 is attached to a horizontal shaft 201 rotatably mounted in a pair of supporting brackets 202 fastened to the plate 139. A short shaft 203 is rotatably mounted in a U-shaped bracket 204, also fastened to the plate 139. A hydraulic cylinder 205 is connected to the plate 139, and the outer end of piston rod 206 of cylinder 205, is connected to the outer end of an arm 207 fastened to a relatively large gear 208, mounted on the shaft 203, and meshing with a relatively small gear 209 mounted on and fastened to the shaft 201. When fluid under pressure is admitted to the head end of cylinder 205, the arm 207 and gear 208 are moved in an anti-clockwise direction, as shown in Fig. 15, and the gear 209 and shield 200 are moved in a clockwise direction, to move the shield into a position in front of head 32, to protect it from slag and heat. Usually the semi-finished steel bodies which are surface conditioned are at an elevated temperature, and each shield 200 is provided with both an inlet hose 210 and an outlet hose 211, so that cooling fluid, such as water, can be circulated through a chamber formed in the shield. When fluid under pressure is admitted to the rod end of cylinder 205, the shield is swung downward and away from the head, as shown in broken lines in Fig. 12, so that the head can desurface the bottom surface of the workpiece.

When the upper beam E or the lower beam F is raised or lowered, it is highly desirable that the beam remain substantially level at all times. As each of the beams is movable horizontally, one or the other pair of cylinders 42 or 42' may, for instance, have to support more weight than the other, and accordingly, a valve mechanism is provided for maintaining the beam horizontal during its vertical movement.

Before conditioning an elongated ferrous metal body such as a billet B, the machine must be correctly adjusted if the previous body was of a different cross-sectional size. By means of valves such as valves V, or by means of the valving mechanism described in the previously referred to copending application, the operator turns on or off the flow of gases to part of the nozzles, so as to vary the effective widths of each desurfacing head in accordance with the width of the corresponding longitudinal surface. The operator, by a suitable preferably electrically-controlled valving means, admits fluid under pressure to either the head or rod ends of the cylinders 149, to adjust the exposed width of each of the side desurfacing heads in accordance with the vertical thickness of the body. The operator, by means of a suitable switch, energizes the motor 79, to vertically adjust the stops 66. If desirable, the pressure of the fluid in the head ends of each of the cylinders 178, can be adjusted to vary the pressure of the top and bottom desurfacing heads against the body, and also the pressure of the fluid for the fluid motors 118' and 121' can be adjusted to vary the pressure of the side desurfacing heads against the body. Normally, it is only necessary to vary the effective width of all or part of the desurfacing heads, and to vary the exposed width of the side heads 31 and 33 when the body to be desurfaced is of a different size than the previous body.

A single drum type controller, such as shown in the U. S. Patent No. 2,244,822, issued June 10, 1941, to James H. Bucknam, may be used for controlling the operation of this desurfacing machine, or separate control means may be provided. In either case, the controls for the machine are preferably positioned on a panel out of the zone of high temperature, and accessible to a single operator.

When not in operation, the desurfacing units U and L are preferably in the withdrawn position, that is, the units have been moved both vertically and horizontally away from each other. After all adjustments have been made, the billet is moved along the roll table until the starting end is in position. The solenoids 104 are energized to release the latching means 87, and both units are moved vertically toward the billet. Fluid is admitted to the motors 118 and 118' and to the motors 121 and 121', to move the units horizontally toward the billet. Preferably, the units are moved simultaneously both vertically and horizontally. After the desurfacing heads are in position, they completely enclose the billet, and the hydraulic motors 118' and 121' urge the units into contact with the billet. The pre-heat gases are turned on and ignited, and after a short pause to heat a peripheral starting zone of the billet to the ignition temperature, the desurfacing oxygen is turned on, and simultaneously the roll table motor is energized to longitudinally move the billet past the heads, and through the area or passage enclosed by the desurfacing heads, so that a substantially uniform and relatively shallow layer of metal is removed from each of the longitudinal surfaces.

After the billet has been desurfaced, the gases are turned off, and the heads preferably are withdrawn from adjacent the billet. If the next body to be desurfaced is of a different size, the effective widths of the desurfacing heads must be adjusted as previously described.

It is obvious that modifications and alterations can be made in the apparatus shown and described and that some of the features can be used with or without the other features, without departing from the spirit or scope of the invention. For instance, an electric motor or motors may be used for raising and lowering the beams E and F; different types of conditioning heads may be adapted to discharge flames only for conditioning the bodies, as by thermally removing scale from the surfaces; and other power-actuated means may be used for vertically adjusting the side heads. The lower beam F could be fixed and the lower desurfacing unit L could be so mounted as to float both vertically and horizontally, the lower side head 33 being adjustable to vary its exposed operative width in the manner shown. The lower desurfacing unit could be maintained in a substantially fixed position, and conveyor guides, such as often employed with a conventional conveyor, as well as the upper side head 31, could hold the workpiece against the lower side head.

What is claimed is:

1. A machine for conditioning the longitudinal surfaces of a metal body such as a steel billet, slab, or the like, of rectangular cross-section while such body is propelled in the direction of its length, such machine comprising, in combination, two surface-conditioning units, each of said units including a pair of blowpipe heads disposed substantially perpendicular to one another, each of said blowpipe heads being constructed to direct a surface-conditioning medium against a corresponding one of said longitudinal surfaces; two substantially horizontal beams, one of said beams disposed above and the other of said beams disposed below the path of movement of said body for supporting said units independently of one another and each of said beams being movable both vertically and horizontally in a plane substantially perpendicular to the path of said body; and mechanism for moving said beams in said plane relatively to one another and either vertically or horizontally or both vertically and horizontally, to move said units either toward or away from one another, to position said blowpipe heads either in operative relation adjacent to, or in inoperative relation away from, the respective surfaces of said body and the path of the latter.

2. Apparatus for thermochemically desurfacing a ferrous metal body while propelled in the direction of its length and comprising, in combination, a desurfacing unit adapted to desurface at least one longitudinal surface of said body when supported in an operative position adjacent said body; a main supporting member on which said unit is mounted for limited movement in opposite directions; an expandible device interposed between said member and said unit; means operable to expand said expandible means; and supporting means for maintaining said supporting member and said unit in an inoperative position and for moving said member and said unit toward said body to bring said unit into contact with said body and to further move and maintain said member in such a position that said unit is substantially midway of its limits of movement relative to said member when in the normal operative position.

3. In surface conditioning apparatus, a surface conditioning unit including a pair of heads for conditioning adjacent longitudinal surfaces of an elongated ferrous metal body, each of said heads being adapted to direct a gaseous stream obliquely against a corresponding one of said surfaces; and controlled power-actuated means for moving one of said heads relative to the other of said heads and in a direction substantially parallel with and transversely of the corresponding one of said surfaces to vary the exposed operable width of said movable head according to the width of the corresponding one of said surfaces.

4. Surface conditioning apparatus as claimed in claim 3 which includes contol means for said power-actuated means and operable to cause said power-actuated means to move said movable head; a synchronous motor transmitter operatively connected to said movable head; an indicator; a synchronous motor receiver operatively connected to said indicator, said transmitter and said receiver being so electrically interconnected as to rotate in unison to cause said indicator to visually indicate the exposed width of said movable head whereby said control means can be correctly operated to vary the exposed operable width of said movable head according to the width of the corresponding one of said surfaces.

5. In surface conditioning apparatus, a surface conditioning unit including a pair of heads for conditioning adjacent longitudinal surfaces of an elongated ferrous metal body, each of said heads being adapted to direct a gaseous stream obliquely against a corresponding one of said surfaces; and means for adjustably moving one of said heads relative to the other of said heads and in a direction substantially parallel with and transversely of the corresponding one of said surfaces to vary the exposed operable width of said movable head; and means for visually indicating the exposed operable width of said movable head whereby said movable head can be so moved by said moving means as to adjust correctly its exposed operable width according to the width of the corresponding one of said surfaces.

6. In a machine for surface conditioning a ferrous metal body, the combination of a conditioning unit adapted to condition at least one surface of said body; means for supporting and maintaining said unit in such a position that said unit is yieldingly urged into contact with said surface; a roller mounted on said unit for movement relative thereto and adapted to engage said surface; and a cylinder connected to said unit and said roller and operable to normally urge said roller against said surface at a variable, predetermined pressure, said pressure tending to decrease the pressure of said unit against said surface to a desired value.

7. In a machine for surface-conditioning a ferrous metal body, the combination of a conditioning unit, mechanism supporting said unit in an operative position relative to said body, said unit being so supported as to be urged into contact with said surface under the influence of gravity; a roller adapted to engage said surface and supported for limited movement relative to said unit and toward and away from said body; and a fluid-operated cylinder connected between said unit and said roller and arranged to urge said roller into contact with said surface at a predetermined pressure to reduce the pressure of said unit against said body.

8. In a machine for surface-conditioning a ferrous metal body, the combination of a conditioning unit; means for supporting said unit and for urging said unit into engagement with said body; a roller mounted on said unit for movement relative to said unit; a fluid-operated cylinder connected to said unit and said roller to urge said roller into contact with said body; and means for adjusting the pressure of the fluid in said cylinder whereby the force of said roller against said body is sufficient to reduce the pressure of said unit against said body to a desired value.

9. In apparatus for thermochemically desurfacing a ferrous metal body, the combination of two desurfacing heads each adapted to apply a gaseous stream obliquely against and along a corresponding surface of said body; means for shutting off the flow of gas to one of said heads to make it inoperative; a shield; and means for moving said shield to a position in front of said inoperative head to prevent damage to said last-mentioned head when only the other of said heads is adapted for use and for moving said shield to a withdrawn position when both of said heads are adapted for use.

10. Apparatus for desurfacing a ferrous metal body such as a steel slab or billet while such body is propelled in the direction of its length, such apparatus comprising, in combination, a desurfacing unit including a pair of blowpipe heads normally adapted to desurface either one longitudinal surface or two adjacent longitudinal surfaces of said body by directing gaseous streams against one or both of said surfaces to remove metal therefrom by the formation of molten slag, and including means for turning off the flow of gas to one of said heads to make it inoperative; means for supporting said unit adjacent said surfaces of said body; a shield supported for movement into a position in front of said inoperative head and to a removed position away from said inoperative head; and means for selectively moving said shield into position in front of said inoperative head to protect it from the slag produced and gas discharged by the other of said heads and into said removed position to permit desurfacing by both of said heads.

11. A machine for surface conditioning a ferrous metal body such as a steel billet while such body is propelled in the direction of its length, said machine comprising, in combination, a conditioning unit including at least one blowpipe head adapted to direct a gaseous stream against and along a longitudinal surface portion of said body; a substantially horizontal beam for supporting said unit, said beam having opposite end portions extending laterally of said unit; a pair of vertically movable cradle members supporting said end portions of said beam, said cradle members being constructed and arranged to provide for horizontal movement of the ends of said beam transversely of and beyond said cradle members; and mechanisms for vertically moving said cradle members and for transversely horizontally moving said beam relatively to said cradle members, operable for vertically or horizontally or for both vertically and horizontally moving said unit away from said body to position said unit in an inoperative position and toward said body to position said unit in an operative position adjacent said body.

12. A machine for surface conditioning a ferrous metal body such as a steel billet while such body is propelled in the direction of its length, said machine comprising, in combination, a conditioning unit including at least one blowpipe head adapted to direct a gaseous stream against and along a corresponding longitudinal surface portion of said body; a substantially horizontal beam, movable both vertically and horizontally, for supporting said unit, said beam having opposite end portions extending laterally of said unit; mechanisms for supporting said end portions of said beam and for vertically or horizontally or for both vertically and horizontally moving said beam and the unit thereon away from said body to position said unit in an inoperative position and towards said body to position said unit in an operative position adjacent said body; and adjustable means for limiting the movement of said beam toward said body in accordance with the size of said body.

13. A machine for surface conditioning a ferrous metal body such as a steel billet while such body is propelled in the direction of its length, said machine comprising, in combination, a conditioning unit including blowpipe means adapted to direct a gaseous stream against and along a corresponding longitudinal surface portion of said body; a substantially horizontal beam for supporting said unit, said beam having opposite end portions extending laterally of said unit; independent lifting mechanisms supporting said end portions and said beam and for vertical movement of said beam and the unit thereon away from said body and towards said body, to position said unit in an operative position adjacent said body, said mechanisms being so constructed and arranged that said beam is horizontally movable relatively thereto; and vertically adjustable stops for limiting the vertical movement of said beam towards said body and the operating position.

14. A machine for surface conditioning a ferrous metal body such as a steel billet while such body is propelled in the direction of its length, said machine comprising, in combination, a conditioning unit including blowpipe means adapted to direct a gaseous stream against and along a longitudinal surface portion of said body; a substantially horizontal beam, movable horizontally, for supporting said unit, said beam having opposite end portions extending laterally of said unit; and mechanisms for supporting said end portions of said beam and for horizontally moving said beam and the unit thereon away from said body to position said unit in an inoperative position and towards said body to position said unit in an operative position adjacent said body, one of said mechanisms for horizontally moving the beam including a roller engaging a surface of said beam and a reversible fluid-operated motor, and another of said mechanisms for horizontally moving said beam, including a roller engaging a surface of said beam and a fluid-operated motor for applying a predetermined torque to said last-mentioned roller for urging said unit against said body at a predetermined pressure.

15. A machine for surface conditioning a ferrous metal body such as a steel billet while such body is propelled in the direction of its length, said machine comprising, in combination, a conditioning unit including blowpipe means adapted to direct a gaseous stream against and along a longitudinal surface portion of said body; a substantially horizontal beam for supporting said unit, said beam being movable horizontally and having opposite end portions extending laterally of said unit; and supporting mechanisms for supporting said end portions of said beam, at least one of said mechanisms including a roller engaging a surface of said beam and a power actuated means operatively connected to said roller for horizontally moving said beam, said power actuated means being constructed and arranged to apply a predetermined torque to said roller for urging said unit against said body at a predetermined pressure.

16. A machine for surface conditioning a ferrous metal body such as a steel billet while such body is propelled in the direction of its length, said machine comprising, in combination, a conditioning unit including blowpipe means adapted to direct a gaseous stream against and along a longitudinal surface portion of said body; a substantially horizontal beam adapted to be positioned above said body and movable both vertically and horizontally for supporting said unit, said beam having opposite end portions extending laterally of said unit; mechanisms for supporting said end portions of said beam and for vertically or horizontally or for both vertically and horizontally moving said beam and the unit thereon away from said body to position said unit in an inoperative position and toward said body to position said unit in an operative position adjacent said body; a pair of latches disposed adjacent said end portions of said beam and adapted for movement into locking position beneath portions of said beam when said beam is raised to said inoperative position, said latches being so constructed and arranged as to prevent any substantial downward movement of said beam when in said locking position; and mechanism adapted to withdraw said latches from said locking position to permit downward movement of said beam and unit toward said body to said operative position.

17. In a machine for surface conditioning a ferrous metal body such as a steel billet the combination of a conditioning unit including blowpipe means adapted to direct at least one gaseous stream against a surface of said body; a member for supporting said unit and movable toward and away from said body, said unit and said supporting member being constructed and arranged for limited relative movement between said unit and said supporting member and toward and away from said body; a pair of cross-arms pivotally connected together at their central portions and having arm portions operatively interposed between said supporting member and said unit, said arms being so constructed and arranged that said arm portions are expandible and contractible; and resilient means tending to expand said arm portions with a force sufficient to counterbalance at least a portion of the weight of said unit whereby said unit is urged into engagement with said body at a predetermined pressure.

18. A surface conditioning machine as claimed in claim 17 in which said resilient means is constructed and arranged to resiliently expand said arm portions normally to move and urge said unit toward said body at a predetermined pressure, and is constructed and arranged for contraction of said arm portions and movement of said supporting member relatively with respect to said unit in a direction toward said body.

19. A surface conditioning machine as claimed in claim 17 in which said unit is urged toward said body under the influence of gravity, and in which said resilient means tends to expand said arm portions and urge said unit away from said body with a force only sufficient to partly counterbalance the weight of said unit, said resilient means being constructed and arranged for expansion of said arm portions and movement of said supporting member relatively to said unit in a direction toward said body.

20. A surface conditioning machine as claimed in claim 17 in which said resilient means includes four toggle links an outer end of each link being pivotally connected to one of said arm portions and the central ends of each pair of said links being pivotally connected together; and a spring operatively connected to the central ends of each pair of links, and tending to move and urge the central link ends in a direction tending to straighten said toggle links and expand said cross-arms.

21. In apparatus for thermochemically desurfacing a ferrous metal body, the combination of at least two blowpipe devices, each adapted to apply a desurfacing gas stream against and along a corresponding surface portion of said body; means for shutting off the supply of gas to one of said blowpipe devices to render it inoperative; a shield; and mechanism for moving said shield to a position in front of said inoperative blowpipe device to prevent damage to said inoperative blowpipe device when the other blowpipe device is in use, and for moving and holding said shield to a withdrawn position when both of said blowpipe devices are in use.

RUDOLPH CHELBORG.
JAMES H. BUCKNAM.
ARTHUR M. KELLER.